United States Patent
Williams

(10) Patent No.: US 12,363,122 B2
(45) Date of Patent: Jul. 15, 2025

(54) TECHNOLOGIES FOR ENABLING PERSONAL COMMUNICATIONS

(71) Applicant: Phoneado Inc., South Orange, NJ (US)

(72) Inventor: Jamille K. Williams, South Orange, NJ (US)

(73) Assignee: Phoneado Inc., South Orange, NJ (US)

( * ) Notice: Subject to any disclaimer, the term of this patent is extended or adjusted under 35 U.S.C. 154(b) by 580 days.

(21) Appl. No.: 17/608,430

(22) PCT Filed: May 1, 2020

(86) PCT No.: PCT/US2020/031055
§ 371 (c)(1),
(2) Date: Nov. 2, 2021

(87) PCT Pub. No.: WO2020/223643
PCT Pub. Date: Nov. 5, 2020

(65) Prior Publication Data
US 2022/0232011 A1    Jul. 21, 2022

Related U.S. Application Data

(60) Provisional application No. 62/920,453, filed on May 2, 2019.

(51) Int. Cl.
*H04L 9/40* (2022.01)
*H04L 67/306* (2022.01)
*H04L 67/1095* (2022.01)

(52) U.S. Cl.
CPC .......... *H04L 63/102* (2013.01); *H04L 63/083* (2013.01); *H04L 67/306* (2013.01); *H04L 67/1095* (2013.01)

(58) Field of Classification Search
CPC ... H04L 63/102; H04L 63/083; H04L 67/306; H04L 67/1095
See application file for complete search history.

(56) References Cited

U.S. PATENT DOCUMENTS

| | | |
|---|---|---|
| 2005/0177612 A1 | 8/2005 | Duong |
| 2008/0214158 A1* | 9/2008 | Osborne ............. H04L 67/1095 455/414.1 |
| 2011/0319056 A1 | 12/2011 | Toy et al. |
| 2012/0310880 A1 | 12/2012 | Giampaolo et al. |
| 2013/0340034 A1* | 12/2013 | Rich .................. H04N 21/4627 726/1 |
| 2016/0103577 A1 | 4/2016 | Greenberg et al. |
| 2017/0352086 A1* | 12/2017 | Sharma ............. G06Q 30/0631 |

FOREIGN PATENT DOCUMENTS

KR    1020170015394    2/2017

OTHER PUBLICATIONS

International Search Report and Written Opinion dated Aug. 7, 2020 in related application PCT/US20/31055 filed May 1, 2020 (7 pages).

* cited by examiner

*Primary Examiner* — Ellen Tran
(74) *Attorney, Agent, or Firm* — Dentons US LLP

(57) ABSTRACT

This disclosure discloses various computing technologies that enable a user to make calls from someone else's mobile device (e.g., mobile phone, smartphone, tablet, laptop, wearable) that is running a mobile application that is programmed for such actions.

23 Claims, 9 Drawing Sheets

TECHNOLOGIES FOR ENABLING PERSONAL COMMUNICATIONS

CROSS-REFERENCE TO RELATED PATENT APPLICATIONS

This patent application claims the benefit of priority to PCT International Application PCT/US20/31055 filed 3 Apr. 2019; which claims a benefit of priority to U.S. Provisional Patent Application 62/920,453 filed on 2 May 2019; each of which is herein incorporated by reference for all purposes.

TECHNICAL FIELD

Generally, this disclosure relates to mobile apps. More particularly, this disclosure relates to personal communications.

BACKGROUND

A user can operate a mobile phone (e.g., iOS, Android) to store a plurality of contacts (e.g., name, phone number, email address) in a dedicated contact application running on the mobile phone. When the mobile phone is lost or disabled, then the user may not be able to quickly access the contacts, even if a back-up service (e.g., iCloud, Android) was enabled, for various reasons (e.g., unavailability of readily available desired replacement phone, time consuming to setup replacement phone). As such, if the user temporarily borrows or rents another mobile phone from another user in order to place a call or send a text communication to one of those contacts, then those contacts are not available to that borrowed or rented phone, unless the user manually re-enters those contacts into the borrowed or rented phone, assuming the user actually remembers the contacts, or accesses the back-up service on that borrowed or rented phone, assuming the mobile phone was originally configured for backing-up the contacts from the dedicated contact application via the back-up service before being lost or disabled. The manual re-entry of contacts into the borrowed or rented phone or accessing the back-up service on that borrowed or rented phone is not always possible or practical for various reasons (e.g., security settings, privacy concerns). Regardless, even if the user ends up using that borrowed or rented phone for placing the call or sending the text communication to one of those contacts, then this state of being can still negatively affect the user because the user lacks easy access to the contacts or the user can accidentally leave the contacts on the rented or borrowed phone, which may be undesired for various purposes (e.g., privacy, mistaken communications). Likewise, this state of being can negatively affect the other user, from whom the phone was rented or borrowed, because at least some private information of the other user on the rented or borrowed phone can be accessed by or exposed to the user who is renting or borrowing the phone. These situations can become even more complicated when the contacts are desired to be accessed on vacation or during business travel or in a disaster relief zone. Accordingly, this disclosure at least partially addresses these situations.

SUMMARY

Generally, this disclosure enables various computing technologies that allow a user to make calls from someone else's mobile device (e.g., mobile phone, smartphone, tablet, laptop, wearable) that is running a mobile application that is programmed for such actions.

In an embodiment, there is provided a method comprising: receiving, by a server, a user login from a first application running on a first mobile device, wherein the user login associates the first application with a user profile stored remote from the first mobile device; receiving, by the server, a first copy of a plurality of contacts from the first application after the user login based on the first application copying the contacts from a second application running on the first mobile device; writing, by the server, the first copy into the user profile; receiving, by the server, the user login from a third application running on a second mobile device, wherein the user login associates the third application with the user profile, wherein the second mobile device runs a fourth application; causing, by the server, the third application to prevent or to lock-out a front-end usage of the fourth application until a user logout from the third application, wherein the user logout disassociates the third application from the user profile; generating, by the server, a second copy of the contacts from the first copy; sending, by the server, the second copy to the third application while the third application prevents or locks-out the front-end usage of the fourth application; and enabling, by the server, a personal communication to be sent by the third application based on at least one of the contacts of the second copy from the second mobile device to a phone while the third application prevents or locks-out the front-end usage of the fourth application.

DETAILED DESCRIPTION

Figure 1:
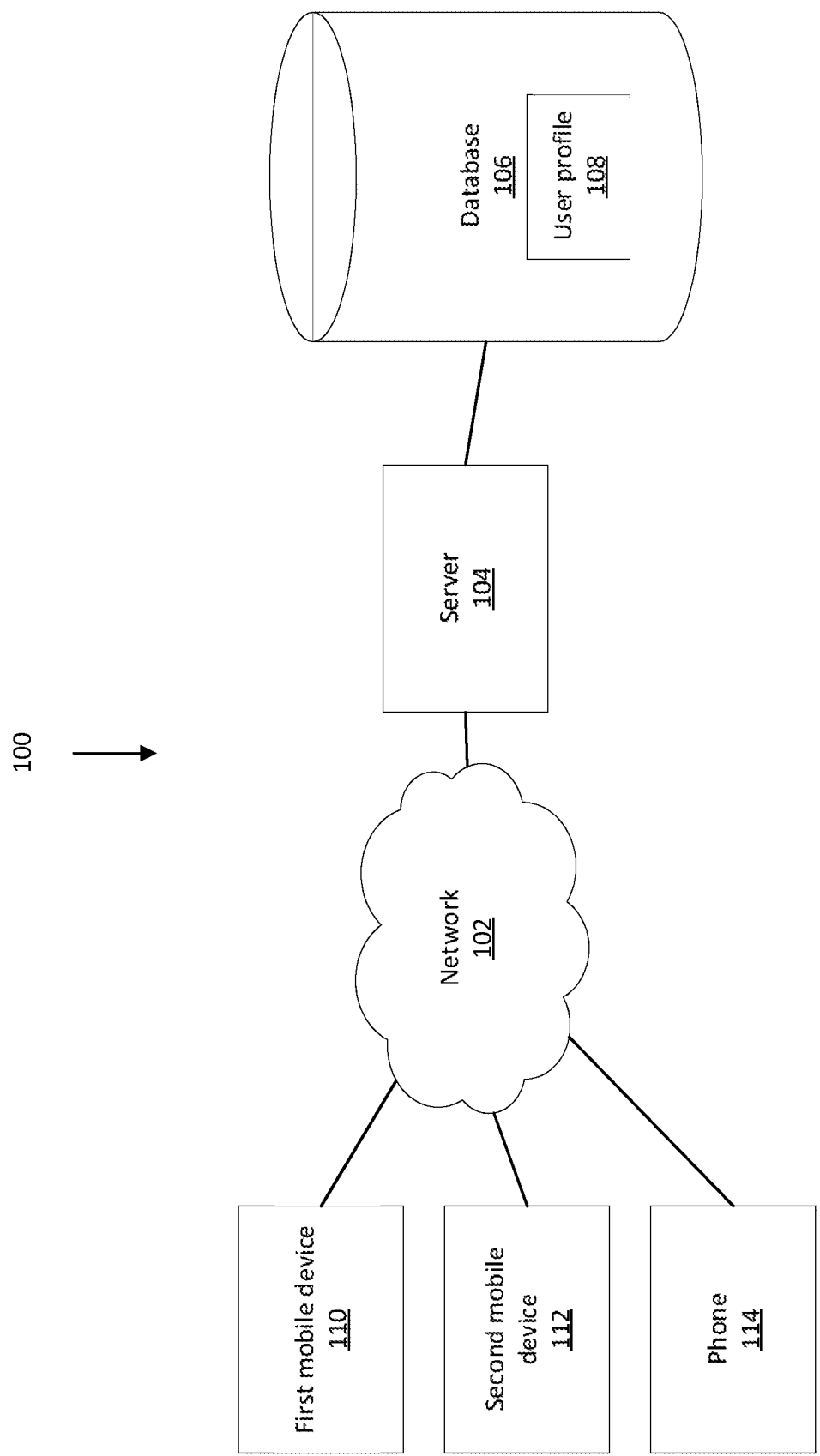
FIG. 1 shows a diagram of an embodiment of a computing architecture according to this disclosure.

Generally, this disclosure enables various computing technologies that allow a user to locate (e.g., cell tower signal triangulation technique, positioning satellite geolocation technique) a mobile device (e.g., mobile phone, smartphone, tablet, laptop, wearable) if the mobile device is lost or stolen. Likewise, the computing technologies enable the user to make calls from someone else's mobile device (e.g., mobile phone, smartphone, tablet, laptop, wearable) that is running a mobile application that is programmed for such actions.

In particular, the mobile application can be used based on a user login with a phone number and a password (e.g., four, five, six, seven, or eight digit password, biometric). Upon the user login into the mobile application running on someone else's mobile device, a set of contacts or other information (e.g., photos, videos, texts, chats, documents, call history, phone settings), as previously uploaded to a server from the mobile device (that is lost, stolen, disabled, or not taken on vacation or business trip, or in a disaster relief zone) associated with the phone number and associated with a user profile, or manually entered into the user profile associated with the phone number, are downloaded from the user profile via or from the server and then appear in the mobile application on someone else's, or another or different, mobile device to make calls, text, share, read, or otherwise access on someone else's, or another or different, mobile device.

Upon a user logout from the mobile application on someone else's, or another or different, mobile device, the set of contacts or other information is deleted or otherwise made permanently inaccessible to that mobile device. Between the user login into the mobile application on someone else's, or another or different, mobile device and the user logout from the mobile application on someone else's, or another or different, mobile device, at least some, many, most, or all other applications on someone else's, or another or different, mobile device are prevented or locked-out from a front-end usage by the mobile application on someone else's, or another or different, mobile device. The front-end usage can involve a user input device including a touchscreen, microphone, camera, physical interface (e.g., button, lever, rocker, slider), peripheral (e.g., joystick), or others. As such, while at least some, many, most, or all other applications on someone else's, or another or different, mobile device are prevented or locked-out from the front-end usage by the mobile application, those applications can still be running on someone else's, or another or different, mobile device and still be performing their functions or be managed by an operating system (e.g., iOS, Android) of or on that someone else's, or another or different, mobile device. For example, if one of those applications is an email application, then the email application can still be running and downloading emails as configured on someone else's, or another or different, mobile device before the user login, but the mobile application prevents or locks-out the email application from the front-end usage between the user login and the user logout. These computing technologies allow for seamless contact portability and quick contact access, while accommodating various security and privacy considerations or limitations, as explained herein.

Further examples of situations where such computing technologies would be useful, include where a user wishes to have a mobile device available for travel, in a vehicle for emergency situation, where there is a likelihood or chance of the mobile device being damaged or destroyed, or as a backup. In such situations, the mobile device could remain empty of contacts information, and could be left unsecured, unguarded, or for extended periods without the concern that another individual will access the contacts or other information on the mobile device. When the user wishes or needs to utilize the mobile device, the user can activate the mobile application, enter their account phone number and passcode, which would then provide for access to the user's contacts and other information. Further, when the user logs out of the mobile application, the contacts and other information would be removed from the mobile device's memory. In some embodiments, the user may enter the same passcode or a different passcode on exit from the mobile application, or at any point in time while the mobile application is active, which would remove all of the contacts and other information. In some embodiments, the contacts and other information are removed automatically after a predetermined time period upon deactivation of the mobile device, deactivation of the mobile application, or lack of movement of the mobile device. In some embodiments, all other applications on the mobile device will become inaccessible to the user once the mobile application is launched. In some embodiments, all other applications on the mobile device will not become accessible to a user after the mobile application is closed until a passcode is entered by the user.

This disclosure is now described more fully with reference to FIGS. 1-8, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

FIG. 1 shows a diagram of an embodiment of a computing architecture according to this disclosure. In particular, a computing architecture 100 includes a network 102, a server 104, a database 106, a user profile 108, a first mobile device 110, a second mobile device 112, and a phone 114.

The network is in communication (e.g., wired, wireless, waveguide) with the server 104 and the first mobile device 110, the second mobile device 112, and the phone 114. The network 102 includes a plurality of computing nodes interconnected via a plurality of communication channels, which allow for sharing of resources, applications, services, files, streams, records, information, or others. The network 102 can operate via a network protocol, such as an Ethernet protocol, a Transmission Control Protocol (TCP)/Internet Protocol (IP), or others. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, or others. The network 102 can include an intranet, an extranet, or others. The network 102 can include Internet. The network 102 can include other networks or allow for communication with other networks, whether sub-networks or distinct networks.

The server 104 is in communication (e.g., wired, wireless, waveguide) with the network 102 and the database 106. The server 104 can include a web server, an application server, a physical server, a virtual server, or others. The server 104 can be included in a computing platform (e.g., Amazon Web Services, Microsoft Azure).

The database 106 is in communication (e.g., wired, wireless, waveguide) with the server 104. The database 106 is remote from the server 104, but can be hosted on the server 104. The database 106 can include a relational database, an in-memory database, a NoSQL database, or others.

The database 106 stores a plurality of records, each associated with or containing the user profile 108, which can be not publically accessible. The user profile 108 includes a user name, a user login, a password for the user login, a set of user data received from the mobile device 110 or manually uploaded to the user profile 108 via the server 104 from another computing device. The set of user data includes contacts, photos, videos, texts, chats, documents, call history, applications, phone settings or other information extracted from the first mobile device 110 or from applications running on the first mobile device 110. Those applications can be task-dedicated applications (e.g., contact application, photo application, call application).

Each of the first mobile device 110, the second mobile device 112, and the phone 114 is in communication (e.g., wired, wireless, waveguide) with the network 102 and with the server 104 through the network 102. Examples of the first mobile device 110, the second mobile device 112, and the phone 114 include mobile phones, cellular phones, smartphones, satellite phones, tablets, personal digital assistants, VOIP phones, POTS phones (phone 114), laptops, wearables, or others. Each of the first mobile device 110, the second mobile device 112, and the phone 114 can include a user input device including a touchscreen, microphone, camera, physical interface (e.g., button, lever, rocker, slider), peripheral (e.g., joystick), or others. For instance, each the first mobile device 110, the second mobile device 112, and the phone 114 can include a mobile phone (e.g., Samsung S10, Motorola Razr) or a tablet (e.g. Apple IPad, Amazon Fire) having a touchscreen, microphone, camera, physical interface and running an Android, iOS or other operating system programmed to run various applications thereon, some of which can be downloaded from an app store (e.g., Google Play, ITunes).

In one mode of operation, a user of the first mobile device 110 can lose the first mobile device 110, or the first mobile device 110 can be stolen from the user or become disabled, or the user may not bring the first mobile device 110 on vacation or business trip, or may not have access to the first mobile device 110. As such, the user can access (e.g., borrow, rent) the second mobile device 112 and then can make calls or send text messages (or otherwise access the set of user data) from the second mobile device 112 that is running a mobile application programmed for such actions. In particular, the mobile application can be used based on a user login with a phone number and a password (e.g., four, five, six, seven, or eight digit password, biometric).

Upon the user login into the mobile application running on the mobile device 112, a set of contacts or other information (e.g., photos, videos, texts, chats, documents, applications, call history, phone settings), as previously uploaded to the server 104 from the first mobile device 110 (that is lost, stolen, or disabled or not brought along to vacation or business trip, or in a disaster relief zone, or not accessible) associated with the phone number and associated with the user profile 108, or manually entered into the user profile 108 associated with the phone number via from another computing device or the first mobile device 110, are downloaded from the user profile 108 via or from the server 104 onto the second mobile device 112 and then appear in the mobile application on the second mobile device 112 to make calls to the phone 114, text the phone 114, share content with the phone 114, read the set of user data, or otherwise access (e.g., write, delete, modify) the set of user data, or other information, or access the applications, as explained herein.

Upon a user logout from the mobile application on the second mobile device 112, the set of user data is deleted or otherwise made permanently inaccessible to the second mobile device 112 until another user login associated with the user profile 108. Between the user login into the mobile application on the second mobile device 112 and the user logout from the mobile application on the second mobile device 112, at least some, many, most, or all other applications on the second mobile device 112 are prevented or locked-out from a front-end usage by the mobile application on the second mobile device 112. In some embodiments, between (a) the user login into the mobile application on the second mobile device 112, and (b) the user logout from the mobile application on the second user device and a user login to the second mobile device 112, at least some, many, most, or all other applications on the second mobile device 112 are prevented or locked-out from a front-end usage by the mobile application on the second mobile device 112 and from the user.

In some embodiments, the user may enter the same passcode or a different passcode on exit from the mobile application on the second mobile device 112, or at any point in time while the mobile application is active on the second mobile device 112, which would remove all of the contacts and other information from the second mobile device 112. In some embodiments, the contacts and other information are removed automatically from the second mobile device 112 after a predetermined time period upon deactivation of the second mobile device 112, deactivation of the mobile application, or lack of movement of the second mobile device 112.

In some embodiments, all other applications on the second mobile device 112 will become inaccessible to the user once the mobile application on the second mobile device 112 is launched. In some embodiments, all other applications on the second mobile device 112 will not become accessible to a user after the mobile application on the second mobile device 112 is closed until a passcode is entered into the second mobile device 112 by the user.

The front-end usage can involve a user input device including a touchscreen, microphone, camera, physical interface (e.g., button, lever, rocker, slider), peripheral (e.g., joystick), or others. As such, while at least some, many, most, or all other applications on the second mobile device 112 are prevented or locked-out from the front-end usage by the mobile application, those applications can still be running on the second mobile device 112 and still be performing their functions or be managed by an operating system (e.g., iOS, Android) of the second mobile device 112. For example, if one of those applications is an email application, then the email application can still be running and downloading emails, but the mobile application on the second mobile device 112 prevents or locks-out the email application from the front-end usage between the user login and the user logout. These computing technologies allow for seamless contact portability from the first mobile device 110 to the second mobile device 112 and quick contact access from the first mobile device 110 to the second mobile device 112, while accommodating various security and privacy considerations or limitations of the first mobile device 110 and the second mobile device 112, as explained herein. These computing technologies also allow for seamless contact portability from a storage location (e.g., cloud storage, database, non-volatile memory, server) to the second mobile device 112 and/or other mobile devices and quick contact access from the storage location (e.g., cloud storage, database, non-volatile memory, server) to the second mobile device 112 or other mobile devices, while accommodating various security and privacy considerations or limitations of the storage location (e.g., cloud storage, database, non-volatile memory, server) and the second mobile device 112, as explained herein.

Figure 2:
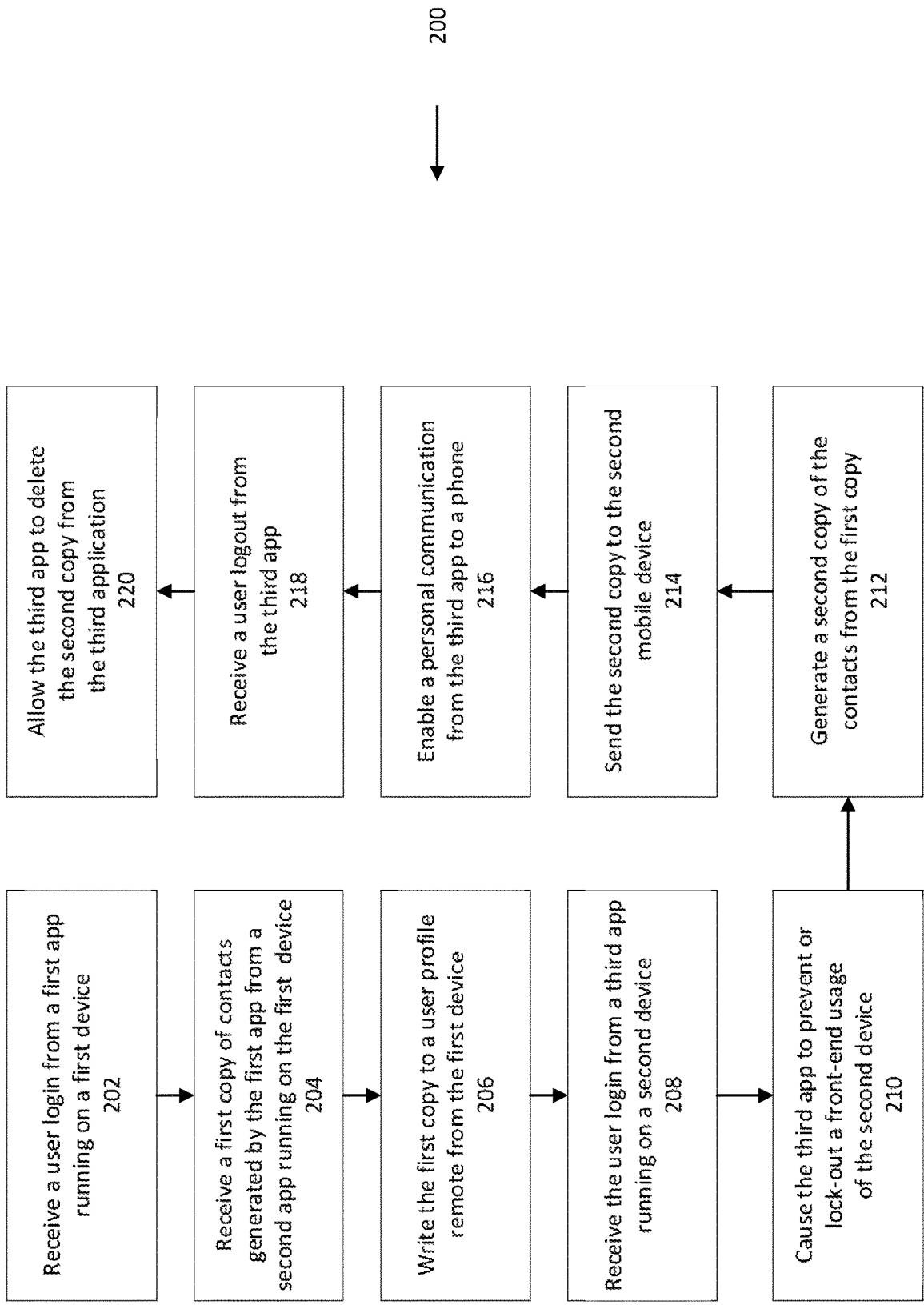
FIG. 2 shows a flowchart of an embodiment of a process for communication according to this disclosure.

FIG. 2 shows a flowchart of an embodiment of a process for communication according to this disclosure. In particular, a process 200 includes a plurality of blocks 202-220. The process 200 is performed using the computing architecture 100, as explained herein.

In block 202, the server 104 receives a user login (e.g., phone number and password) from a first application running on the first mobile device 110. On the server 104 and on the first mobile device 110, the user login logically associates the first application with the user profile 108 stored in the database 106 remote from the first mobile device 110.

In block 204, the server 104 receives a first copy of contacts from the first mobile device 110. The first copy can be received based on the server 104 receiving the first copy from the first application after the user login based on the first application copying the contacts from a second application running on the first mobile device 110. For example, each of the contacts can include a data entry or record having a populated name field, a populated phone number field, and a populated email address field (although other communication parameter fields are possible). The first copy is a single copy or a plurality of copies, one copy per information item (e.g., contact, photo, video). The second mobile application can be a dedicated contact application or can be a non-dedicated contact application storing the contacts (e.g., email application, social networking application). Note that other information can be copied as well (e.g., photos, videos, texts, chats, documents, applications, call history, phone settings) from the first mobile device 110 or the second mobile application or other applications on the first mobile device 110. Further, note that the user can control, which contacts or user data the first application can copy. For example, the user can program (e.g., enter file name or metadata or content criteria or heuristics), what contacts or user data the first application will copy.

Based on the user login into the first application on the first mobile device 110, the server 104 can cause the first application on the first mobile device 110 to prevent or to lock-out the front-end usage of the second application on the first mobile device 110 until the user logout from the first application on the first mobile device 110, where the user logout disassociates the first application from the user profile. The server 104 can cause the first application to prevent or to lock-out the front-end usage of the second application based on validating the user login and requesting the first application on the first mobile device 110 to prevent or the lock-out the front end usage of the second application. However, note that the server 104 can cause the first application on the first mobile device 110 to prevent or to lock-out the front-end usage of the second application on the first mobile device 110 until the user logout from the first application on the first mobile device 110 by preventing or locking-out the front-end usage of all applications on the first mobile device 110 including the second application on the first mobile device 110. In some embodiments, upon activation and prior to login, the first application can prevent or lock-out the front-end usage of all or some other applications on the first mobile device 110 until the user logs in to the first mobile device and/or enters a deactivation code to terminate or deactivate the first application.

In block 206, the server 104 populates the user profile 108 with the first copy based on the server 104 writing the first copy into the user profile. This population can include the contacts or other information (e.g., photos, videos, texts, documents, chats, applications, call history, phone settings) from the first mobile device 110 or the second mobile application or other applications on the first mobile device 110.

In block 208, the server 104 receives the user login (e.g., phone number and password) from a third application running on the second mobile device 112. On the server 104 and on the second mobile device 112, the user login logically associates the third application with the user profile 108 stored in the database 106 remote from the second mobile device 112. The second mobile device 112 runs a fourth application. The fourth mobile application can be a dedicated contact application or can be a non-dedicated contact application storing the contacts (e.g., email application, social networking application). The first mobile device 110 can be a phone having a phone number, where the user profile 108 stores the phone number and a PIN, where the PIN is associated within the phone number in the user profile 108, where the user login is the phone number and the PIN. As such, the user login for the first application on the first mobile device 110 and the second mobile device 112 can be same.

In block 210, the server 104 causes the third application to prevent or to lock-out a front-end usage of the fourth application until a user logout from the third application on the second mobile device 112. The first application and the third application can be a same application (e.g., different computing instances of same application). In some embodiments, upon activation and prior to login, the third application can prevent or lock-out the front-end usage of all or some other applications on the second mobile device 110 until the user logs in to the second mobile device and/or enters a deactivation code to terminate or deactivate the third application.

The user logout logically disassociates the third application from the user profile 108. The server 104 can cause the third application to prevent or to lock-out the front-end usage of the fourth application based on validating the user login and requesting the third application on the second mobile device 112 to prevent or the lock-out the front end usage of the fourth application. However, note that the server 104 can cause the third application on the second mobile device 112 to prevent or to lock-out the front-end usage of the fourth application on the second mobile device 112 until the user logout from the third application on the second mobile device 112 by preventing or locking-out the front-end usage of all applications on the second mobile device 112 including the third application.

The third application on the second mobile device 112 can be not accessible until a code (e.g., password, PIN, biometric) is entered (e.g., virtual keyboard, camera, fingerprint sensor) into the third application on the second mobile device 112, which can be between the user login and the user logout or before the user login or after the user logout. The fourth application on the second mobile device 112 can be not accessible until the third application on the second mobile device 112 is deactivated or closed on the second mobile device 112 and a code (e.g., password, PIN, biometric) is entered (e.g., virtual keyboard, camera, fingerprint sensor) into the third application on the second mobile device 112, which can be between the user login and the user logout or before the user login or after the user logout.

The server 104 can cause the third application on the second mobile device 112 to prevent the front-end usage of the fourth application (or all applications) on the second mobile device 112 until the user logout from the third application based on the third application actively monitoring open windows or open screens or open applications on the second mobile device 112 and then actively preventing the front-end usage of the fourth application based thereon. The third application can actively monitor based on active threads associated with applications or their windows or screens, discriminating between active or passive threads associated with applications or their windows or screens, or other ways.

The server 104 can cause the third application on the second mobile device 112 to lock-out the front-end usage of the fourth application on the second mobile device 112 until the user logout from the third application based on requiring a "key" to open the front-end usage. The "key" can include the login or another password or a PIN or a biometric.

The second mobile device 112 includes a user input device. The front-end usage includes usage (e.g., touching, speaking, imaging, moving, pressing) of the fourth application on the second mobile device 112 is via the user input device. The user input device can include a touchscreen, microphone, camera, physical interface (e.g., button, lever, rocker, slider), peripheral (e.g., joystick), or others.

In block 212, the server 104 generates a second copy of the contacts from the first copy. The second copy is a single copy or a plurality of copies, one copy per informational item (e.g., contact, photo, video). Note that the second copy can include the contacts or other information (e.g., photos, videos, texts, chats, documents, applications, call history, phone settings) from the first mobile device 110 or the second mobile application or other applications on the first mobile device 110. The second copy of the contacts (or other user data) is generated on the server 104 from the first copy of the contacts based on the user login into the third application on the second mobile device 112 and validation thereof on the server 104.

In block 214, the server 104 sends the second copy to the third application on the second mobile device 112 while the third application prevents or locks-out the front-end usage of the fourth application or all applications.

In block 216, the server 104 enables a personal communication to be sent by the third application based on at least one of the contacts of the second copy from the second mobile device 112 to the phone 114 while the third application on the second mobile device 112 prevents or locks-out the front-end usage of the fourth application. The personal communication can be an OTT call, a P2P call, an SMS message, a chat message, a videoconference, or others.

In block 218, the server 104 receives a user logout from the third application of the second mobile device 112. The user logout can be a signal or a semaphore activation or deactivation informing of the user logout from the third application on the second mobile device 112.

In block 220, the server 104 allows the third application to delete, remove, or otherwise make permanently inaccessible (until another corresponding user login) the second copy from the second mobile device 112. This can occur by the server 104 requesting the third application on the second mobile device 112 to proceed accordingly upon validating the user logout. In some situations, the third application on the second mobile device 112 can be programmed to cause the user logout on the third application upon completion of the personal communication. As such, this user logout can trigger the third mobile application to delete, remove, or otherwise make permanently inaccessible (until another corresponding user login) the second copy from the second mobile device 112.

The server 104 can receive a third copy of photos or videos (or other user data) from the first application on the first mobile device 110 after the user login on the first mobile device 110 based on the first application on the mobile device 110 copying the photos or videos (or other user data) from the first mobile device 110 (including dedicated or non-dedicated applications running on the first mobile device 110). The server 104 can write the third copy into the user profile 108. The third copy is a single copy or a plurality of copies, one copy per informational item (e.g., photo, video). The server 104 can generate a fourth copy of the photos or videos from the third copy. The server 104 can send the fourth copy to the third application on the second mobile device 112 while the third application prevents or locks-out the front-end usage of the fourth application on the second mobile device 112. As such, the server 104 can enable the personal communication containing one of the photos or videos from the fourth copy to be sent by the third application from the second mobile device 112 based on at least one of the contacts of the second copy from the second mobile device 112 to the phone 114 while the third application on the second mobile device 112 prevents or locks-out the front-end usage of the fourth application on the second mobile device 112. The server 104 can allow the fourth copy to be deleted, removed, or otherwise made permanently inaccessible (until another corresponding user login) from the third application on the second mobile device 112 based on the user logout. This can occur by the server 104 requesting the third application on the second mobile device 112 to proceed accordingly upon validating the user logout.

In situations where the user uses the third application to capture photos or videos while being logged-in (between the user login and the user logout), then those photos and videos can be uploaded to the user profile 108 through the network 102 before or during the user logout so that those photos and videos can be subsequently accessed after the user logout. The photos or video can be uploaded immediately upon capture or periodically en masse (e.g., every 1 minute, every 15 minutes, every 1 hour, every 12 hours, every day).

The user login can associate the first application or the third application with the user profile other than installing the first application on first mobile device or the third application on the second mobile device, respectively. Likewise, the user logout can disassociate the first application from the user profile or the third application from the user profile other than uninstalling the first application from the first mobile device or the third application from the second mobile device.

Figure 3:
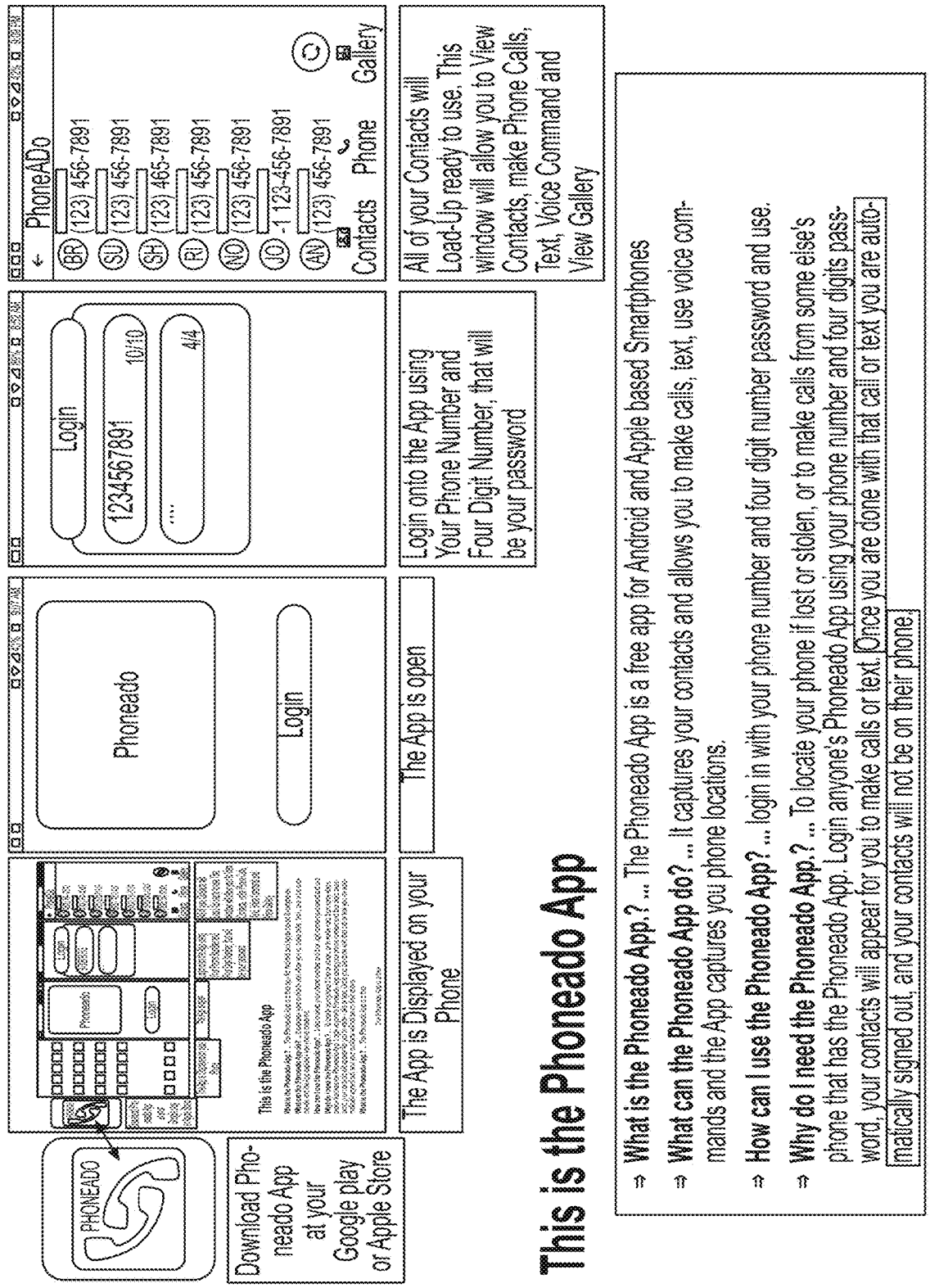
FIG. 3 shows a set of screenshots of an embodiment of a mobile application according to this disclosure.

FIG. 3 shows a set of screenshots of an embodiment of a mobile application according to this disclosure. In particular, the set of screenshots shows the user login into the mobile application (red background) and downloading of the contacts or other user data and presenting the contact or other user data for use, as explained herein. For example, the mobile application that is programmed can be the third application on the second mobile device 112. It can be programmed to cause the user to logout on the third application upon completion of the personal communication. As such, this user logout can trigger the third mobile application to delete, remove, or otherwise make permanently inaccessible (until another corresponding user login) the second copy from the second mobile device 112.

Figure 4:
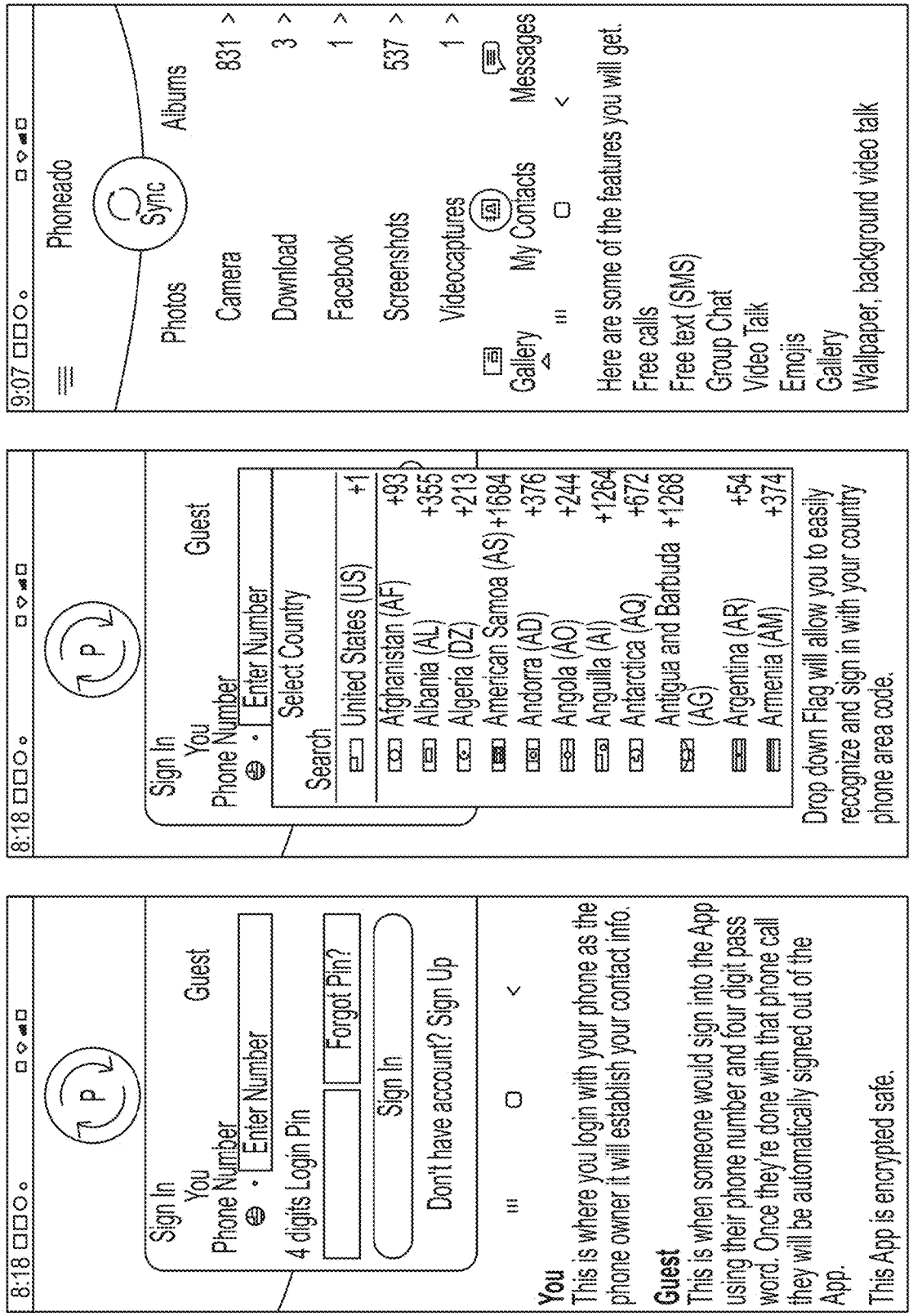
FIG. 4 shows a set of screenshots of an embodiment of a mobile application according to this disclosure.

FIG. 4 shows a set of screenshots of an embodiment of a mobile application according to this disclosure. In particular, the set of screenshots shows the user login into a mobile application under an owner or administrator account and under a guest account on someone else's mobile device. For example, the mobile application can be the first mobile application running on the first mobile device 110, where the user login under the owner or administrator account can occur via a phone number and a password or a PIN or a biometric. As such, the first copy of contacts (or other user data) can be formed and uploaded to the server 104 over the network 102. Note that for entering of the phone number, the mobile application can present a dropdown menu (or autocomplete field or another user input element) to select a country for an area code or a phone number format of the phone number. Likewise, the mobile application can be the third mobile application running on the second mobile device 112, where the user login under the guest account can occur via the phone number and the password or the PIN or the biometric. For example, the mobile application as programmed can be the third application on the second mobile device 112 that can be programmed to cause the user logout on the third application upon completion of the personal communication. As such, this user logout can trigger the third mobile application to delete, remove, or otherwise make permanently inaccessible (until another corresponding user login) the second copy from the second mobile device 112.

As shown in the set of screenshots, the mobile application can provide for various functionality and settings that can be accessed (e.g., calls, SMS, group chat, video talk, emojis, photo or video gallery, wallpaper background, wallpaper background video talk) based on the user login. Note that these features and various settings for these features can follow based on the user login and can be removed, deleted, or otherwise permanently inaccessible (until another corresponding user login) based on the user logout.

Figure 5:
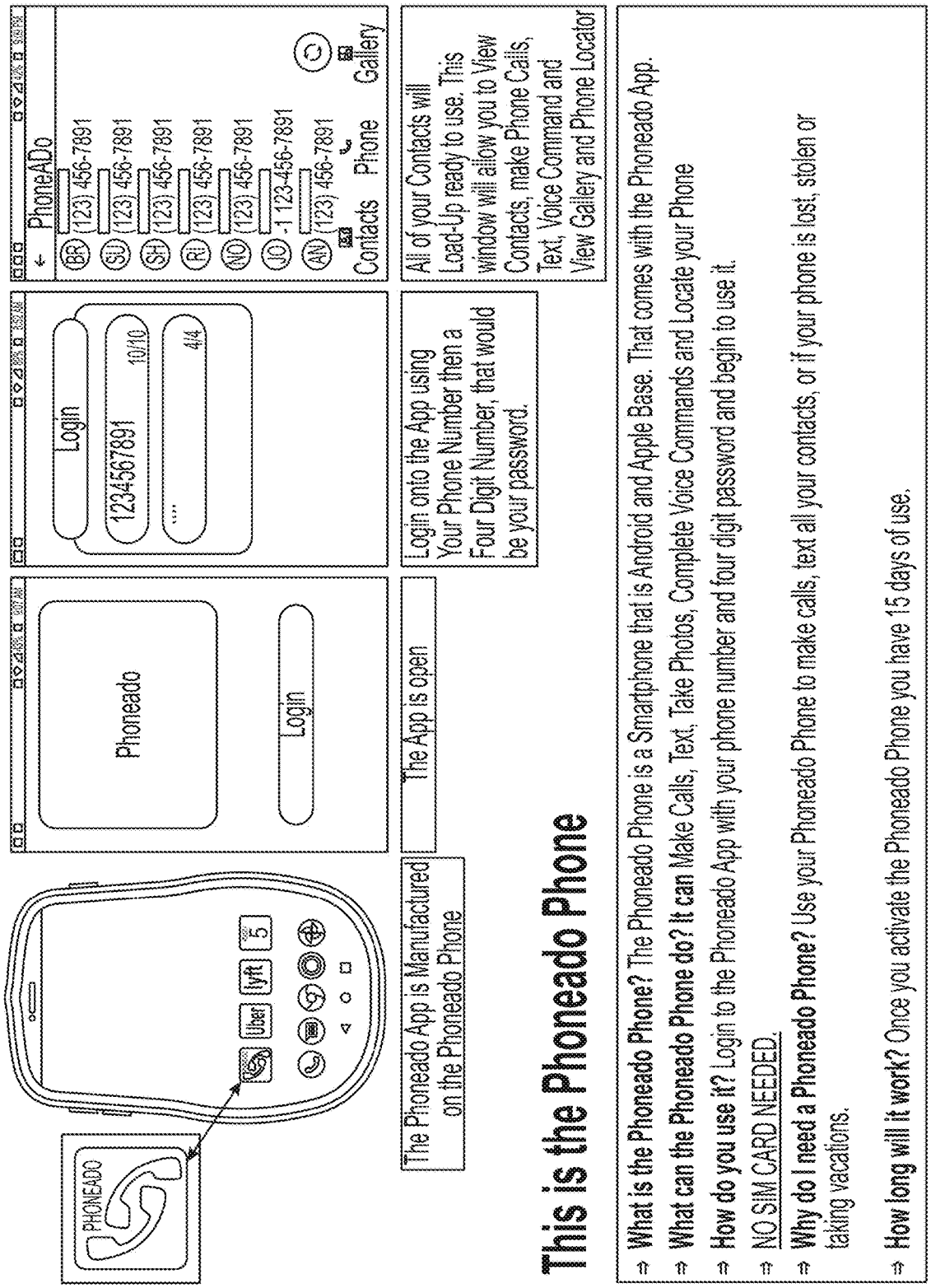
FIG. 5 shows an embodiment of a mobile device according to this disclosure.
Figure 6:
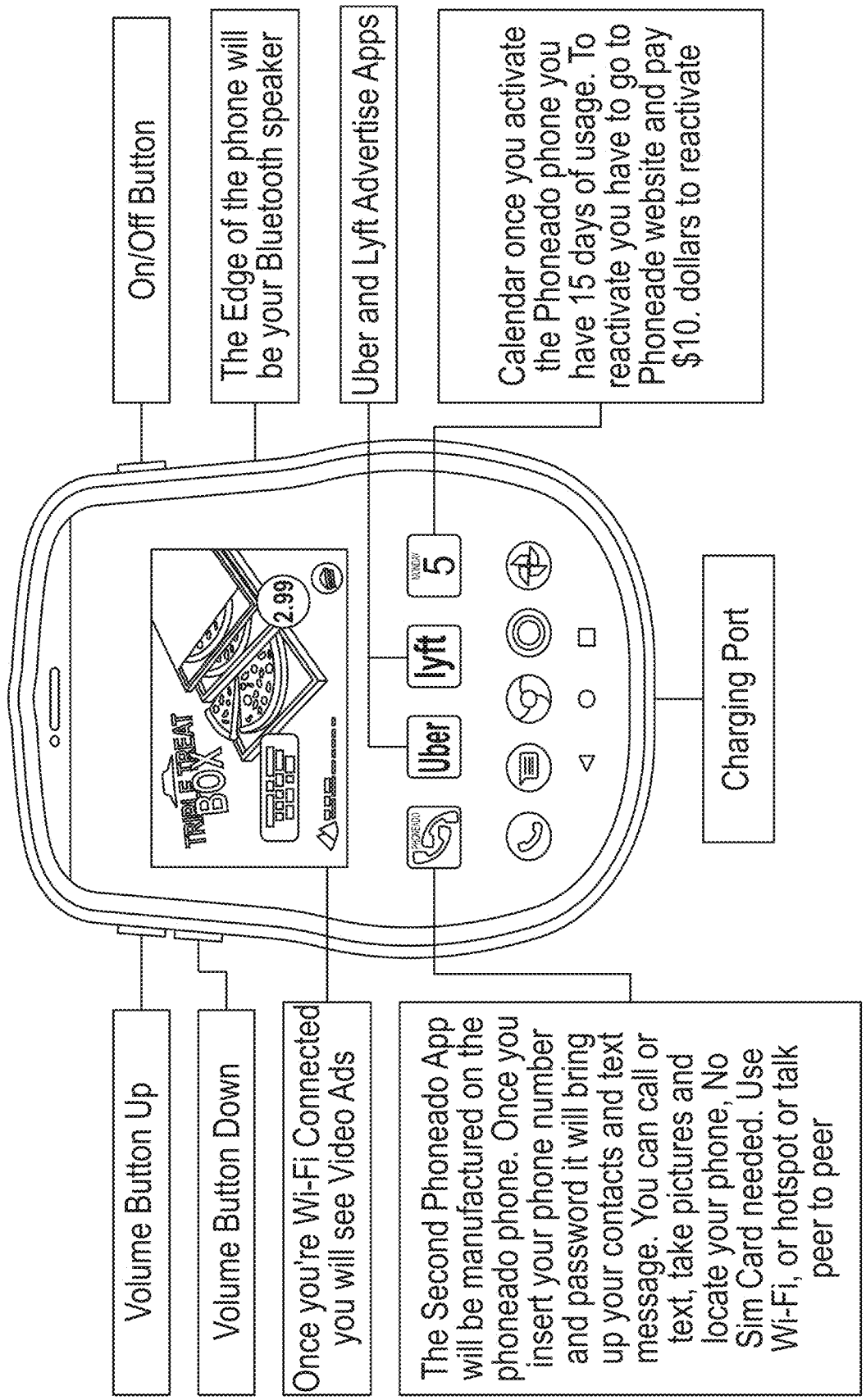
FIG. 6 shows an embodiment of a mobile device according to this disclosure.

FIG. 5 shows an embodiment of a mobile device according to this disclosure. FIG. 6 shows an embodiment of a mobile device according to this disclosure. In particular, the mobile device does not have a SIM card. As such, the mobile device communicates based on Wi-Fi or Li-Fi or another suitable data communication protocol, whether wired, wireless, or waveguide. The mobile device is dedicated for inbound or outbound personal communication based on a dedicated mobile application programmed for such communication, as explained herein. However, note that, in some embodiments, the mobile device can have the SIM card and communicate via various cellular protocols (e.g., CDMA, GSM).

The mobile device can operate as the first mobile device 110, the second mobile device 112, or the phone 114. Therefore, as shown in various screenshots, based on the user login, the contacts or other user data, as described herein, are presented within the dedicated mobile application. As such, the personal communication can be sent or received via the dedicated mobile application based on the contacts that the dedicated mobile application downloaded from the server 104 from the user profile 108. The personal communication can include the user data, as described herein.

The mobile device can be programmed to be activated (e.g., for inbound and outbound personal communication) for a predetermined time period (e.g., 4 months, 2 calendar weeks, 3 days, 2 hours, 15 minutes). The predetermined time period can be started from an initial user login when the mobile device is received in a new state or a state configured for such use (e.g., received used from rental store). The mobile device may or may not have a lock screen, where the lock screen can be operative independent of the mobile device being activated for the predetermined time period, as described herein. For example, the mobile device may have the lock screen that can be unlocked to grant access to the dedicated mobile application. However, the dedicated mobile application is not operative without the user login, as described herein. Likewise, other mobile applications are not operative or cannot be accessed until the dedicated mobile application is activated via the user login, as described herein. For example, when the dedicated mobile application receives the user login, the dedicated mobile application can activate other mobile applications (e.g., allow or request operating system to run those mobile applications) already preinstalled on the mobile device at that time.

The mobile device can be preloaded with a preset number of mobile apps that cannot be removed by an end user (e.g., not permissioned, part of operating system), unless an administrator login is used to do so. However, more mobile apps can be added to the mobile device based on the end user electronically paying (e.g., PayPal, Venmo, cryptocurrency wallet) an operator or owner of the mobile device from the mobile device, which can be via the dedicated mobile application or a dedicated payment application preinstalled on the mobile device (also cannot be removed by the end user without the administrator login). As such, upon the user electronically purchasing some specific mobile app (or number of mobile apps) to be placed on the mobile device, the operator or owner of the mobile device can electronically and remotely permission the mobile device to download (e.g., Wi-Fi, Li-Fi) that specific mobile app (or number of mobile apps) to the mobile device. This permissioning can be dependent on the predetermined time period, as described herein, which can include the mobile apps being automatically deleted or made inactive or not usable or locked-out by the dedicated mobile application or dedicated payment application or an operating system of the mobile device or remote command from the server 104 upon expiration of the predetermined time period, which can be while those mobile apps are active in-use or after those mobile apps are closed or determined not to be used or moved into background. The mobile app (or number of mobile apps) can be downloaded by the mobile device over the network 102 from an authorized app store (e.g., Google Play, ITunes) or side-loaded via a USB drive (or some other form of memory).

Figure 7:
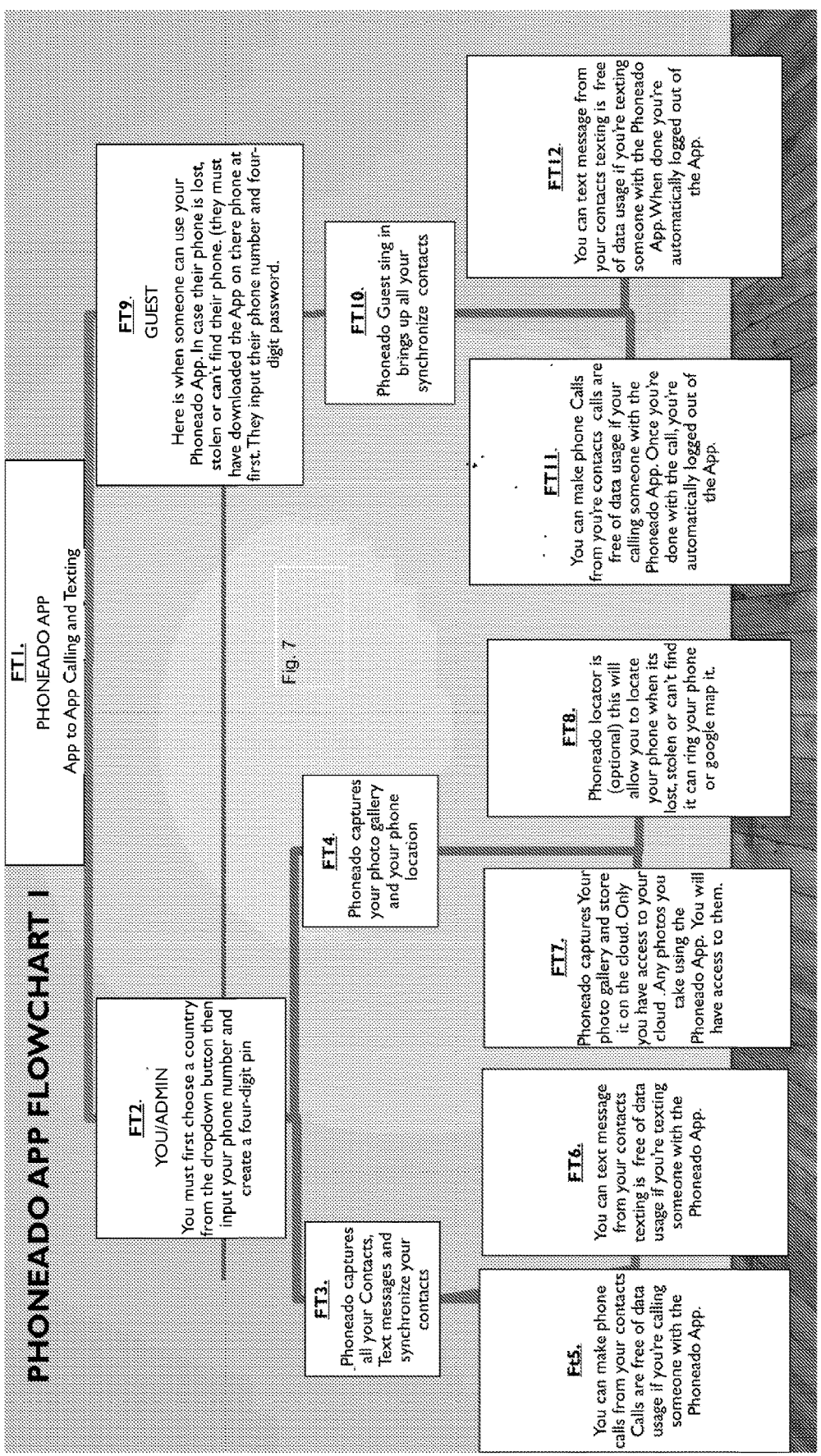
FIG. 7 shows a diagram of a logic flow of an embodiment of a mobile application according to this disclosure.

FIG. 7 shows a diagram of a logic flow of an embodiment of a mobile application according to this disclosure.

Figure 8:
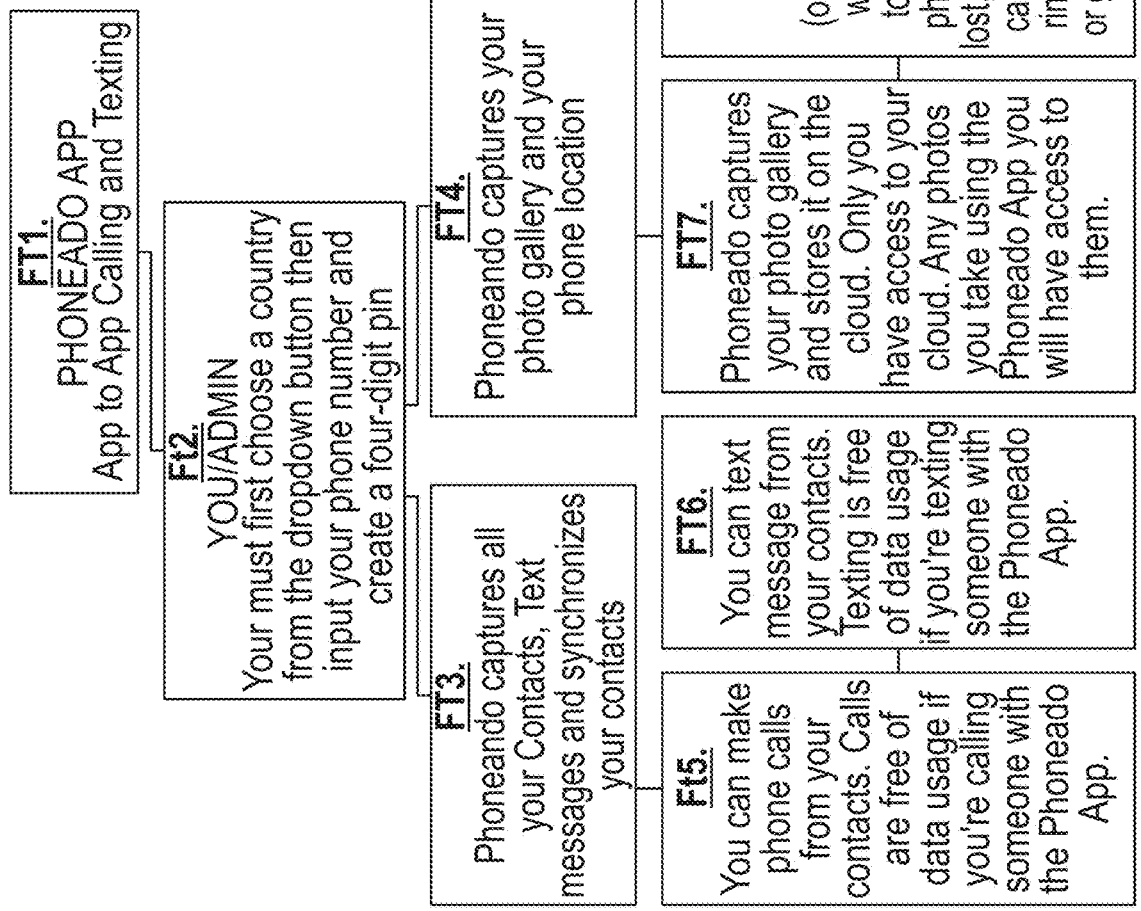
FIG. 8 shows a diagram of a logic flow of an embodiment of a mobile device according to this disclosure.

FIG. 8 shows a diagram of a logic flow of an embodiment of a mobile device according to this disclosure.

Figure 9:
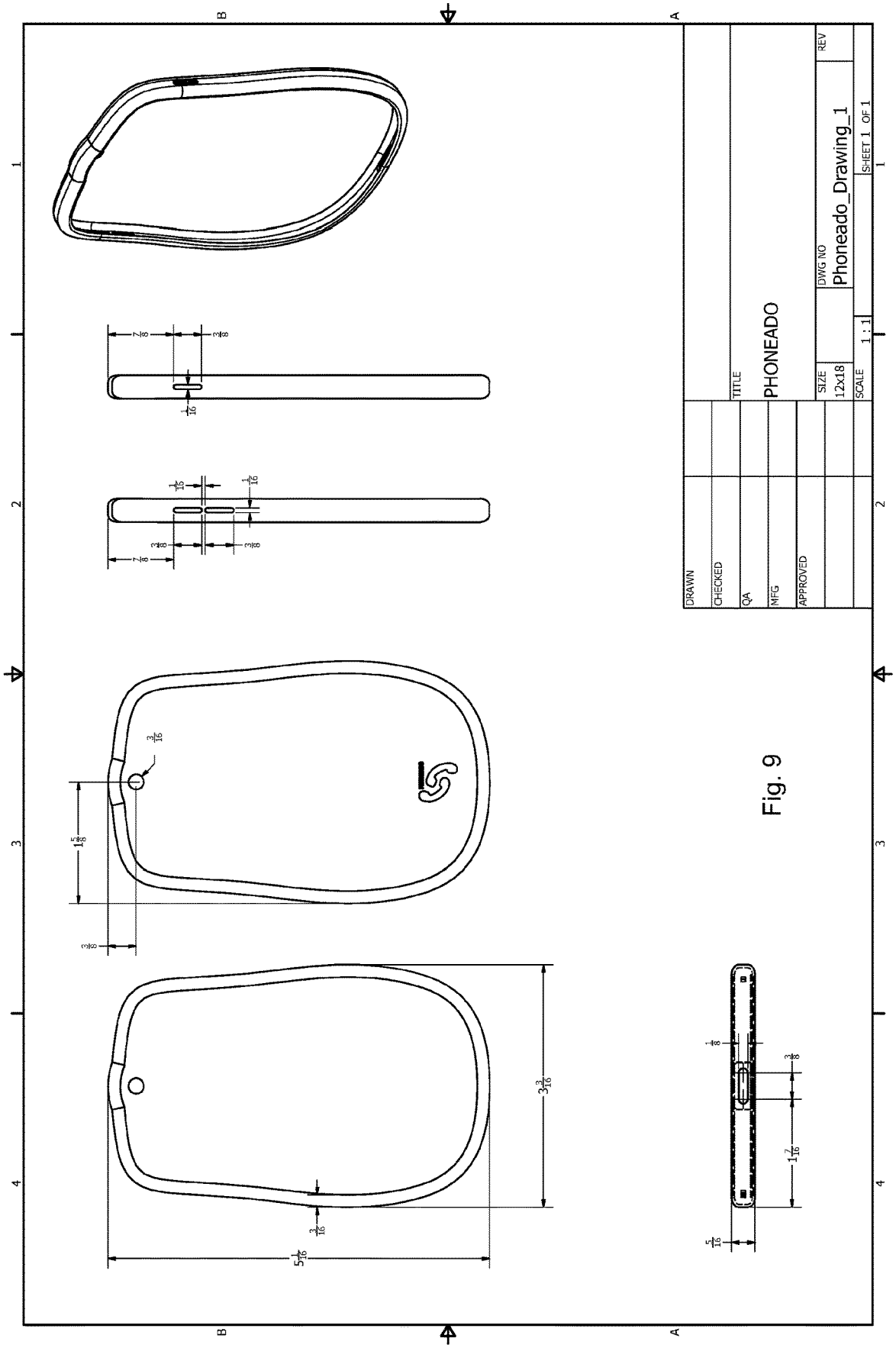
FIG. 9 shows multiple views of an embodiment of a mobile device according to this disclosure.

FIG. 9 shows multiple views of an embodiment of a mobile device according to this disclosure. It shows an ornamental design of a mobile device. FIG. 9 includes a front view, a back view, a right side view, a left side view, a top view, and a perspective view of the mobile device.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including hyperlinked articles, web pages, and websites) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A method comprising:
   receiving, by a server, a user login from a first application running on a first mobile device, wherein the user login associates the first application with a user profile stored remote from the first mobile device;
   receiving, by the server, a first copy of a plurality of contacts from the first application after the user login based on the first application copying the contacts from a second application running on the first mobile device;
   writing, by the server, the first copy into the user profile;
   receiving, by the server, the user login from a third application running on a second mobile device, wherein the user login associates the third application with the user profile while the user profile is maintained remotely from the second mobile device, wherein the second mobile device runs a fourth application, and wherein the second mobile device is not usable by the user prior to acceptance of the user login by the server;
   causing, by the server, the third application to prevent or to lock-out a front-end usage of the fourth application until a user logout from the third application, wherein the user logout disassociates the third application from the user profile;
   generating, by the server, a second copy of the contacts from the first copy;
   sending, by the server, the second copy to the third application while the third application prevents or locks-out the front-end usage of the fourth application; and
   enabling, by the server, a personal communication to be sent by the third application, based on at least one of the contacts of the second copy, from the second mobile device to a phone while the third application prevents or locks-out the front-end usage of the fourth application.

2. The method of claim 1, wherein the user is a first user, and wherein the server causes the third application to prevent the front-end usage of the fourth application until the first user logout from the third application and a second user login to the third application.

3. The method of claim 1, wherein the user is a first user, and wherein the server causes the third application to lock-out the front-end usage of the fourth application until the first user logout from the third application and a second user login to the third application.

4. The method of claim 1, wherein the second mobile device includes a user input device, wherein the front-end usage includes usage of the fourth application via the user input device.

5. The method of claim 4, wherein the user input device is a touchscreen.

6. The method of claim 4, wherein the user input device is a microphone.

7. The method of claim 4, wherein the user input device is a camera.

8. The method of claim 4, wherein the user input device is a physical interface.

9. The method of claim 1, further comprising:
allowing, by the server, the second copy to be deleted from the third application based on the user logout.

10. The method of claim 1, wherein the personal communication is an OTT call, a P2P call, an SMS message, a chat message, or a videoconference.

11. The method of claim 1, wherein the server causes the third application to prevent or to lock out the front-end usage of the fourth application until the user logout from the third application by preventing or locking-out the front-end usage of all applications on the second mobile device including the third application.

12. The method of claim 1, wherein the first mobile device is a phone having a phone number, wherein the user profile stores the phone number and a PIN, wherein the PIN is associated within the phone number in user profile, wherein the user login is the phone number and the PIN.

13. The method of claim 1, further comprising:
receiving, by the server, a third copy of photos or videos from the first application after the user login based on the first application copying the photos or videos from the first mobile device;
writing, by the server, the third copy into the user profile;
generating, by the server, a fourth copy of the photos or videos from the third copy;
sending, by the server, the fourth copy to the third application while the third application prevents or locks-out the front-end usage of the fourth application; and
enabling, by the server, the personal communication containing one of the photos or videos from the fourth copy to be sent by the third application based on at least one of the contacts of the second copy from the second mobile device to the phone while the third application prevents or locks-out the front-end usage of the fourth application.

14. The method of claim 13, further comprising:
allowing, by the server, the fourth copy to be deleted from the third application based on the user logout.

15. The method of claim 1, wherein the fourth application is not accessible until the third application is deactivated or closed and a code is entered into the third application.

16. The method of claim 1, wherein the third application is not accessible until a code is entered into the third application.

17. The method of claim 1, wherein the user is a first user, and further comprising:
causing, by the server, the first application to prevent or to lock-out the front-end usage of the second application until the user logout from the first application, and a second user login to the first application, wherein the user logout disassociates the first application from the user profile.

18. The method of claim 17, wherein the server causes the first application to prevent or to lock out the front-end usage of the second application until the user logout from the first application by preventing or locking-out the front-end usage of all applications on the first mobile device including the first application.

19. The method of claim 1, wherein the second application is a dedicated contact application.

20. The method of claim 1, wherein the first application and the third application is a same application.

21. The method of claim 1, wherein the user is not the owner of the second device and wherein the server causes the third application to prevent or to lock-out a front-end usage of all applications on the second device other than the third application until the user logout from the third application and the owner login to the third application, wherein the user logout disassociates the third application from the user profile.

22. The method of claim 1, wherein the server causes the third application to prevent or lock-out the front-end usage of the fourth application after at least one of a predetermined period of time from use of the third application by an owner of the second device or an input to the second device from the owner.

23. A method comprising:
registering a first mobile device with a server;
associating, by the server, the first mobile device with a first user, wherein a profile for the first user is stored at the server and the first user is identified in the first user profile as a primary user or owner of the first device;
receiving, by the server, a first user login from a first application running on the first mobile device, wherein the user login associates the first application with the first user profile;
storing, by the server, a profile for a second user, wherein the second user is not associated with the first mobile device;
causing, by the server, the third application to prevent or lock-out the front-end usage of a second application stored on the first mobile device after at least one of a predetermined period of time from use of the first application by the first user or an input to the second device from the first user;
receiving, by the server, a second user login from the first application, wherein the user login associates the first application with the second user profile while the second user profile is maintained remotely from the first mobile device, wherein only the first application is usable by the second user after acceptance of the second user login by the server; and
enabling, by the server, a personal communication to be sent by the second user via the first application, based on at least one contact of the second user downloaded from the second user profile.

* * * * *